UNITED STATES PATENT OFFICE 2,680,716

MAKING SULFONATES SUITABLE FOR USE IN SOLUBLE OIL

Moses Robert Lipkin, Havertown, and Henry Ernest Reif, Drexel Hill, Pa., assignors to Sun Oil Company, Philadelphia, Pa., a corporation of New Jersey No Drawing. Application September 12, 1951, Serial No. 246,338

4 Claims. (Cl. 252—33)

This invention relates to the sulfonation of mineral oil to obtain sulfonates suitable for use in soluble oil.

Sulfonation of mineral oil generally results in the formation of oil-soluble, or mahogany, sulfonic acids, and also of oil-insoluble, or green, sulfonic acids. The alkali metal soaps of mahogany sulfonic acids are in some cases suitable for use as emulsifying agents in soluble oils, which are homogeneous mixtures of oil and emulsifying agent, the soluble oil being capable of dilution with water to form oil-in-water emulsions suitable for use as cutting oils in metal-working operations, as spray oils, as rustproofing oils, etc. Alkali metal soaps of green sulfonic acids are generally unsuitable for use in soluble oils.

Previously, sulfonates suitable for use in soluble oil have been prepared from sulfonic acids obtained by sulfonating mineral oil at relatively low temperatures, i. e., temperatures below for example 100° F. According to one embodiment of the present invention, sulfonates suitable for use in soluble oil are prepared from sulfonic acids obtained by sulfonating mineral oil with gaseous $SO_3$ at temperatures within the approximate range 180° F. to 300° F. It has been found that sulfonic acids whose soaps are suitable for use in soluble oil can be prepared by sulfonation with gaseous $SO_3$ at such high temperatures. It has also been found that the use of relatively high sulfonation temperatures is advantageous in that the mineral oil charge and products are more fluid at higher temperatures, so that little or no tendency for plugging of liquid transfer lines is encountered when temperatures within the approximate range 180° F. to 300° F. are employed, and also in that relatively higher temperatures favor the formation of mahogany sulfonic acids over the formation of green sulfonic acids. It is desirable to produce large amounts of mahogany acids relative to green acids, not only because mahogany acids are a more valuable product, but also because the green acids, by their solid nature, make it difficult, when they are present in large proportion, to handle the sulfonation products in ordinary commercial apparatus.

In the process of the invention, gaseous $SO_3$ is used as sulfonating agent, and such use is advantageous in that with gaseous $SO_3$ there is little or no waste of sulfonating agent, whereas with sulfuric acid or oleum, the green acids and spent sulfuric acid are found in the sludge, from which it is difficult or impossible to recover sulfuric acid for further use as sulfonating agent.

According to a particularly advantageous embodiment of the invention, a sulfonation charge stock is prepared by removing, from a lubricating oil distillate, about 25–70 percent of the molecules therein which contain an aromatic ring. Such removal of aromatics according to the invention is selective in that molecules in which the ratio of the aromatic portion of the molecule to the nonaromatic portion is relatively high are selectively removed, the unremoved aromatics being generally those wherein the ratio of the aromatic portion of the molecule to the nonaromatic portion is relatively low. The use of a charge stock from which aromatics have selectively been removed, e. g. by solvent refining, is advantageous in that the green acids obtained therefrom are less viscous and easier to handle in a commercial process than green acids obtained in the sulfonation of a charge material from which aromatics have not been removed. Also, at comparable sulfonation conditions, a higher yield of mahogany sulfonic acids, based on the proportion of aromatics in the oil prior to solvent refining, can generally be obtained from a mineral oil which has been treated for aromatics removal than from the same oil before such treating. The reason for this is probably that certain aromatic constituents in the oil, which constituents would form green acids upon sulfonation, are removed in the treating, so that other aromatics, which would not sulfonate as readily as the removed constituents, are enabled to form mahogany sulfonic acids which would not have been formed in the presence of the removed constituents. Finally, the ratio of mahogany to green acids in the sulfonation products is generally higher in the case of a treated oil than in the case of an untreated oil.

Solvents which can be used according to this embodiment of the invention, for extraction of aromatic constituents from lubricating oil distillates include: phenol, furfural, sulfur dioxide, boron trifluoride, hydrogen fluoride, mixtures of the last two, etc. Furfural is a preferred solvent for use according to this embodiment of the present invention.

Solvent refining is preferred, according to the invention, for removing aromatic constituents from lubricating oil distillates in order to prepare sulfonation stocks, but other suitable methods for selective removal of green-acid-forming aromatics can be employed according to the invention. For example, the distillate can be percolated through silica gel to selectively adsorb the green-acid-forming constituents. Whatever method is used for selectively removing green-acid-forming constituents from lubricating oil distillates, the present invention contemplates the removal of certain proportions, as subsequently specified, of the aromatics in the original distillate.

According to one embodiment of the present invention, mineral lubricating oil is sulfonated with gaseous $SO_3$ at a temperatre within the approximate range 180° F. to 300° F., and alkali metal soaps of the mahogany sulfonic acids thus produced are blended with petroleum oil to obtain a soluble oil. The use of sulfonation temperatures as above-specified provides in the sulfonation advantages as above-described, and it has been found that the alkali metal soaps of the mahogany sulfonic acids thus produced are entirely suitable for use in soluble oil. Soluble oils containing such soaps have emulsifiability, emulsion stability, and corrosion resistance characteristics which meet the rigorous commercial requirements for soluble cutting oils for use in metal working operations.

It has been found that lower sulfonation temperatures than 180° F. result in proportions of green acids in the products which are disadvantageously high. Higher temperatures than 300° F. tend to produce a disadvantageously highly carbonized green acid product, and also cause discoloration in the oil and mahogany acid products. The sulfonation temperature according to this embodiment of the present invention, is within the range 180°–300° F. for a substantial proportion of the effective period of contact between charge oil and $SO_3$. Since the sulfonation reaction is exothermic, the heat generated by the reaction provides a substantial proportion of the heat needed to raise the temperature of the charge oil to the desired temperature. Therefore, it is possible to charge the oil to the sulfonation zone at a substantially lower temperature than the desired sulfonation temperature; shortly after introduction into the sulfonation zone, the charge oil is heated to the desired temperature, at or above which it remains for a major proportion of its residence time in the sulfonation zone. In some cases, it may be unnecessary to preheat the charge oil at all before introduction into the sulfonation zone. Generally, it is unnecessary to cool the sulfonation zone, or otherwise control the sulfonation temperature as in the prior art, since the temperature will not ordinarily rise above 300° F. A preferred sulfonation temperature range is 200° F. to 250° F.

According to a further embodiment of the present invention, a mineral lubricating oil distillate is treated to remove at least about 25 weight percent, and not more than about 70 weight percent of the aromatic constituents of that distillate; the treated oil thereby obtained, containing about 30–75 percent as much aromatics as the original distillate, is then sulfonated with gaseous $SO_3$ until at least 10 weight percent of the residual aromatics in the treated oil have reacted; the sulfonation is stopped before 70 weight percent of the residual aromatics in the treated oil have reacted. Sulfonic acids can then if desired be removed from the product oil, and the acid-free oil further sulfonated in a recycle operation as subsequently described, but in each pass through the sulfonation zone 70 percent is the maximum degree of sulfonation.

The combination of aromatics removal to the above-specified degree and of sulfonation to the above specified degree is advantageous in that it makes possible a maximum yield of mahogany acids, based on the weight of the original distillate while still maintaining a mahogany acids to green acids ratio of at least 1. The prior art apparently has not recognized that in sulfonation with gaseous $SO_3$, to obtain the above-described result, the degree of sulfonation of aromatics in a sulfonation charge stock should be kept below a certain level. It has now been discovered that in sulfonation of treated charge stocks as above-specified, after 70 percent of the aromatics have been sulfonated, further sulfonation, without first removing mahogany acids from the oil, produces green acids almost exclusively. If the sulfonation is stopped, however, before 70 percent of the aromatics have been sulfonated, a relatively small proportion of green acids is formed.

According to a further embodiment of the present invention, a mineral lubricating oil distillate is sulfonated with gaseous $SO_3$, at a temperature within the approximate range 180° F. to 300° F., until at least 10 weight percent of the aromatics in the distillate have reacted; the sulfonation is stopped before 70 weight percent of the aromatics in the distillate have reacted.

The use of the relatively high sulfonation temperature increases the ratio of mahogany acids to green acids in the product, and sulfonation to the above-specified degree further increases the ratio of mahogany acids to green acids to provide an operation in which mahogany acid formation is maximized and green acid formation minimized to a degree hitherto unknown.

According to the present invention, charge oil is introduced into contact with gaseous $SO_3$ in a sulfonation zone, and sulfonation products are withdrawn from the sulfonation zone. The products include: green sulfonic acids, i. e., the portion of the products which is insoluble in mineral oil; unreacted mineral oil; and mahogany sulfonic acids, i. e., the portion of the sulfonic acid products which is soluble in mineral oil.

The sulfonation products can be introduced into a settling zone, from which exhaust gases can be vented. The green acids collect at the bottom of the settling zone in a layer containing a small amount of oil, e. g., about seven percent. The supernatant liquid may contain, for example, about 10 percent mahogany sulfonic acids and can if desired be neutralized and used as a soluble oil with or without admixing additional mineral oil.

Alternatively, if desired, the supernatant liquid, after neutralization, can be treated for removal of part of the oil to obtain a more concentrated sulfonate solution. For example, one volume of the supernatant liquid can be mixed with up to one volume, of a hydrocarbon solvent, preferably a saturated hydrocarbon solvent having 5 to 10 carbon atoms. The resulting mixture can, if it contains any residual green acids, i. e., pepper sludge, be introduced into a second settling zone, wherein the pepper sludge settles to the bottom. The supernatant liquid withdrawn from this second settling zone is a solution substantially free from pepper sludge. This solution can be saponified with an approximately stoichiometric amount of alkali metal hydroxide, and then contacted with a 25–60 percent aqueous solution of an alkyl alcohol having less than 4 carbon atoms, the volume ratio of alcohol, on an anhydrous basis, to sulfonates, on an oil-free basis, being within the approximate range 1 to 5. The resulting mixture can be introduced into a third settling tank, wherein two immiscible layers are formed, an upper layer comprising a solution of unreacted oil in hydrocarbon solvent, and the lower layer comprising a solution of mahogany sulfonates in aqueous alcohol. The layers can be separately removed from the settling tank and each distilled, e. g., with steam, to vaporize hydrocarbon solvent and aqueous alcohol. If, however, the oil layer is to be recycled, as subsequently described, the hydrocarbon solvent can be recycled too, and distillation of the oil layer is not always necessary. The unreacted oil recovered from the hydrocarbon layer is substantially free from sulfonic acids. The mahogany sulfonates recovered from the aqueous layer may contain, e. g., about 20 percent oil, unless make-up oil has been added to replace the oil removed in the alcohol extraction. These mahogany sulfonates can be blended with lubricating oil to form soluble oils having good properties for use as cutting oil and other purposes.

In the previously described treatment of the sulfonation products, the volume ratio of hydrocarbon solvent to oil should not be greater than 1.0 since, when settling in the presence of hydrocarbon solvent has been preceded by another settling step, more solvent than 1 volume per volume of oil is not required for good separation, and if more is used, the cost of subsequently recovering the solvent will be too great. The neutralization of the sulfonic acids should be done with a stoichiometric amount of alkali metal hydroxide; if more is used, the ultimate sulfonate product tends to contain disadvantageous excesses of alkali metal hydroxide. The concentration of aqueous alcohol should not be less than 25%; otherwise, the removal of sulfonates from the hydrocarbon phase tends to be incomplete, and the cost of removing water from the sulfonates becomes disadvantageously high. The concentration should not be greater than 60 percent; otherwise, the oil content of the aqueous layer tends to be too high. The volume ratio of alcohol to sulfonates should not be less than one if the sulfonates are to be substantially completely removed from the oil phase, and if the oil content of the aqueous layer is to be low enough. Little advantage is secured from using volume ratios of alcohol to sulfonates greater than 5.

The unreacted oil, from which mahogany acids have been removed as described above, can be withdrawn as a product of the process, which product is a highly refined special lubricant, or a portion of the oil raffinate can be returned as recycle oil to the sulfonation zone for conversion of a portion of its residual aromatic constituents to mahogany sulfonic acids. Mahogany sulfonates separated in concentrated form from sulfonation reaction products can be blended with additional petroleum oil to obtain a soluble oil, or they can be used in any other suitable manner.

The mahogany sulfonic acids prepared as specified herein are particularly useful for incorporation, as alkali metal soaps, in soluble oil. The sulfonation conditions employed according to the invention are particularly effective in preparing sulfonic acids suitable for such use. The mahogany acids prepared are also suitable, however, for use in other applications as known in the art. Green sulfonic acids, though generally not as valuable a product as mahogany acids, their formation being accordingly minimized according to the present invention, are known to be useful in certain applications, and the limited amount of green acids prepared as specified herein can be used in such applications. Certain preferred constituents can be extracted from the green acids with selective solvents as known in the art. Green acids prepared according to the present invention are superior in that they are free from sulfuric acid.

The charge oil which is sulfonated according to the present invention preferably has aromatic constituents whose average molecular weight is in the general neighborhood of 375, so that the average molecular weight of monosulfonated mahogany acids produced therefrom is in the general neighborhood of 455. A generally suitable range of average molecular weight of mahogany acids is about 400–500. The sulfonation charge generally has an S. U. viscosity at 100° F. within the approximate range 200 to 1000 seconds.

According to the present invention, mahogany sulfonic acids prepared as herein specified can be incorporated as alkali metal soaps in soluble oil. The saponified mahogany acids are admixed with the petroleum oil which forms the base of the soluble oil, which also preferably contains alkali metal soaps of natural or synthetic naphthenic acids. The petroleum oil is generally a light lubricating oil, e. g., one having a viscosity of 100 seconds S. U. at 100° F. Generally, the oil which is sulfonated to obtain the mahogany sulfonic acids is a heavier oil so that some dilution of the sulfonation product is necessary in preparing a soluble oil. Some dilution is generally necessary anyway, according to the present invention, since the unreacted oil, after separation from green acids, generally contains a substantially higher proportion of sulfonic materials than is desired in the soluble oil. The proportion of mahogany acid in the soluble oil is preferably such, when naphthenates are present, that the organic $SO_3$ content of the soluble oil is within the approximate range 0.45% to 0.60%. The alkali metal naphthenate concentration can vary, is generally such as to provide an equivalent carboxyl saponification value of about 16–20. Other constituents such as mutual solvents can be incorporated in the soluble oil in the manner known in the art.

According to the present invention mineral oil to be sulfonated is contacted with reaction gases, which are preferably dry, containing sulfur trioxide. A carrier gas such as nitrogen or air can be employed in the reaction gases. The reaction gases can be prepared for example by bubbling the carrier gas through liquid sulfur trioxide or through oleum. Any other suitable method can be employed. The mole percent $SO_3$ in the reaction gases is preferably within the approximate range 2 to 50 percent, more preferably 5–30 percent. Higher percentages than 50 can be used, but the result is larger proportions of undesirable materials in the product.

The following examples illustrate the invention:

EXAMPLE I

A lubricating oil distillate obtained from the vacuum distillation of saponified reduced naphthenic crude petroleum, the distillate containing 45 percent aromatic constitutents and having S. U. viscosity at 100° F. of 943, S. U. viscosity at 210° F. of 62, viscosity-gravity constant 0.885, and API gravity 19.4, is furfural-refined to obtain a raffinate weighing about 0.75 times as much as the original distillate. The raffinate has S. U. viscosity at 100° F. of 600 seconds, S. U. viscosity at 210° F. of 58 seconds, viscosity-gravity constant 0.855, API gravity 23.2, and 27 percent aromatic content.

In continuous operation 100 barrels per day of this raffinate, together with 100 barrels per day of recycle oil obtained as subsequently described, are contacted with a gaseous mixture consisting essentially of SO₃ and air, the mixture being prepared by contacting 45,000 standard cubic feet per day of air with liquid stabilized SO₃ to vaporize SO₃ at the rate of 4000 pounds per day. The volume percent of SO₃ in the sulfonation gas mixture thus produced is about 25, and the weight ratio of SO₃ to oil charged is about 0.125. The sulfonation gases and oil charge are passed horizontally through a sulfonation vessel with agitation provided by rotating paddles. The residence time of oil in the vessel is about three seconds. The raffinate charge is preheated and the temperature of the oil charge consisting of the raffinate and recycle is about 150° F. at the inlet to the sulfonation vessel. Upon intimate contact of the sulfonation gases with the oil charge, the temperature rises rapidly to about 250° F. and is at or near that level throughout a major proportion of the residence time of the oil charge in the sulfonation vessel. The sulfonation products are discharged into a settling tank. 4740 pounds per day of green sulfonic acids are removed from the bottom of the tank. The supernatant liquid comprising unreacted oil and dissolved mahogany sulfonic acids is removed and stripped with air to remove small amounts of exhaust gases. The oil and mahogany acids are then dissolved in 125 barrels per day of petroleum naphtha and introduced into a second settling tank where residual green acids, or "pepper sludge," settle out and are removed from the bottom of the tank. The supernatant oil and mahogany acids are removed and saponified, then extracted with 50 per cent aqueous isopropanol to obtain, after removal of solvents, 6860 pounds per day of mahogany sulfonates and 170 barrels per day of unreacted oil containing 12 percent aromatics. 100 barrels per day of this unreacted oil are recycled to the sulfonation step, and the remainder is removed as a product of the process, having API gravity 25.7, S. U. viscosities of 430 seconds at 100° F. and 54 seconds at 210° F., and viscosity index 55.

It is seen from this example that the ratio of mahogany acids to green acids produced in the described process is much greater than one, and that the yield of mahogany sulfonates based on the weight of the original distillate is also quite high: From 100 barrels per day of 23.2 API raffinate oil, i. e., from 32,000 pounds per day of oil, 6860 pounds per day of mahogany sulfonates, i. e., 6540 pounds per day of mahogany sulfonic acids, assuming an average molecular weight of 366 for the aromatics before sulfonation, is obtained. This is about a 20 weight percent yield based on the raffinate, or about 15 percent based on the original distillate. Without recycle, the yields would probably be about half as great.

It is noted that in the above example, about 49 percent of the residual aromatics in the raffinate charge oil reacted in each pass through the sulfonation vessel, about 51 percent of the aromatics remaining unreacted. That is, from 28 barrels per day of aromatics in the raffinate and 12 barrels per day of aromatics in the recycle, 8.4 barrels per day of unreacted aromatics in the product oil and 12 barrels per day of aromatics in the recycle, were obtained, the unreacted aromatics obtained thus representing 51 percent of the aromatics supplied to the sulfonation. The overall conversion of aromatics was 100 (1−8.4/28), or about 70 percent.

As subsequently shown, if much higher consumptions of aromatics per pass are obtained, the ratio of mahogany acids to green acids becomes too low for a commercially suitable process.

EXAMPLE II

In each of the runs reported in this example, mineral oil was preheated and discharged into a reaction vessel, wherein it was contacted with a mixture of gaseous SO₃ and nitrogen. After a residence time of about 3–5 minutes, the sulfonated oil was discharged from the reaction vessel into a receiving vessel, from which exhaust reaction gases were vented. The sulfonated oil was analyzed to determine the amount of green and mahogany sulfonic acids therein. The amount of green acids was determined by centrifuging the sulfonated oil to obtain a liquid, "sour oil" phase and a separated solids phase; after decanting most of the sour oil and after removal of residual sour oil from the solids phase by extraction with n-pentane, the solids phase was weighed to determine the yield of green acids. The amount of mahogany acids was determined by analyzing a sample of saponified sour oil according to the clay-separation procedure for determining the relative proportions of mineral oil, sodium sulfonates, and resins in a mixture thereof, as disclosed by J. M. Koch in the "Analytical Edition of Industrial and Engineering Chemistry," volume 16, page 25, 1944; from the proportion of mahogany sulfonate in the sour oil and the total weight of sour oil including residual sour oil recovered from solution in pentane by distillation of the latter, the yield of sodium mahogany sulfonate was determined. From the average molecular weight of the aromatic constituents of the charge oil, sodium mahogany sulfonate yields were converted to mahogany sulfonic acid yields, assuming replacement of one hydrogen atom in the molecule by an SO₃H group during sulfonation.

Four different charge oils were sulfonated in the following runs. All were furfural-refined lubricating oil distillates from saponified naphthenic-base petroleum. Charge oil A was prepared by extracting a lubricating distillate with furfural to remove preferentially extractable constituents amounting to 13 percent of the distillate. Charge oil B was prepared by removing 21 percent of the distillate; charge oil C, by removing 25 percent; charge oil D, by removing 35 percent. The distillate extracted to obtain charge oils A and C had a viscosity-gravity constant of about 0.883 and an average molecular weight of about 397; the distillate extracted to obtain charge oils B and D had a viscosity-gravity constant of about 0.885 and an average molecular weight of about 375. In all four cases, the distillate before extraction had an aromatics content of about 45%. The properties of the four charge oils were as follows:

*Table I*

|  | A | B | C | D |
|---|---|---|---|---|
| Viscosity-gravity constant | 0.871 | 0.863 | 0.855 | 0.855 |
| Average molecular weight | 390 | 414 | 410 | 417 |
| Aromatics content, percent | 37 | 34 | 27 | 26 |
| Average molecular weight of aromatics | 356 | 373 | 366 | 371 |

The following table shows the effect of the degree of solvent refining of a lubricating distillate on the yield of mahogany acids obtained in sulfonation of the raffinate with gaseous SO₃ to give a mahogany to green acid ratio in the neighborhood of 1 or greater. In the table, the values for percent aromatics removed represent the weight proportion of aromatics in the solvent extract to aromatics in the original distillate. The values for percent aromatics reacted represent the weight proportion of aromatics consumed in the sulfonation to aromatics in the raffinate. These values were determined by percolating the unreacted oil, after separation of green acids and mahogany acids therefrom, through silica gel, the aromatics being selectively adsorbed by the gel. The weight ratio of unreacted aromatics to aromatics in the raffinate provides, by subtracting from one, or 100 percent, the percent aromatics reacted. In all the following results, the mahogany acid yields are based on the weight of the original distillate before solvent refining.

Table II

| Run No. | Charge Oil | Percent Aromatics Removed | Percent Aromatics Reacted | Percent Mahogany Acid Yield | Ratio of Mahogany to Green Acid |
|---|---|---|---|---|---|
| 1 | A | 29 | 36 | 6.4 | 0.9 |
| 2 | B | 40 | 47 | 9.5 | 1.2 |
| 3 | C | 56 | 53 | 7.9 | 1.2 |
| 4 | D | 62 | 58 | 7.6 | 2.0 |

The above table shows that charge oil B, prepared from a lubricating oil distillate by removing 40 per cent of the aromatics therein, gave a higher mahogany acid yield than the other three charge oils, prepared by removing 29, 56, and 62 percent of the aromatics from a lubricating oil distillate. The degree of solvent refining involved in the preparation of charge oils A, C, and D is considered suitable according to the present invention, but the degree of solvent refining involved in preparing charge oil B is preferred.

The above table shows that the degree to which a lubricating oil distillate is solvent refined before sulfonation according to the present invention is important. Between 25 and 70 percent of the aromatics in the distillate should be removed. If less than 25 are removed, an unsatisfactorily low ratio of mahogany acids to green acids is obtained. If more than 70 percent are removed, an unsatisfactorily low yield of mahogany acids based on the weight of the original distillate is obtained. An optimum degree of removal of aromatics is from about 35 to 55 percent. In Example I, the solvent refining removed about 24 pounds of aromatics from each 100 pounds of lubricating distillate to produce about 75 pounds of raffinate containing about 21 pounds of aromatics; this was an aromatics removal of about 53 percent.

Under the conditions of degree of solvent-refining as described above and degree of sulfonation as exemplified in the above example and as further discussed subsequently, it is generally possible to obtain a ratio of mahogany to green acids in the product of at least 1, and a yield of mahogany acids, without recycle, of at least 6 percent based on the weight of the original distillate.

EXAMPLE III

The runs reported in this example were performed in the same manner as that described in Example II. In both runs, charge oil B as specified above was sulfonated at a temperature of 248° F., measured inside the sulfonation vessel near the oil outlet therefrom. The conditions were similar in the two runs except that a higher mole percent of $SO_3$ in the reaction gases was employed in run 5 than in run 6, with the result that a greater degree of sulfonation of aromatics was obtained in run 5. The following table presents the results:

Table III

| Run No. | Percent $SO_3$ in Reaction Gas | Percent Aromatics Reacted | Mahogany Acid Yield | Ratio of Mahogany to Green Acid |
|---|---|---|---|---|
|  |  |  | Percent |  |
| 5 | 38 | 61 | 7.7 | 0.3 |
| 6 | 13 | 47 | 9.5 | 1.2 |

Runs 5 and 6 show that according to the present invention not more than 60 percent of the aromatics contained in a charge oil such as charge oil B should be sulfonated: not only is the mahogany acid yield diminished by reacting more than 60 percent of the aromatics, but the amount of green acids is disadvantageously much increased. By reference to Table II it is seen that a charge oil such as charge oil D, prepared by removing a greater proportion of aromatics in the solvent refining step, can probably be sulfonated to a greater degree without obtaining a disadvantageously low ratio of mahogany to green acids. Generally, if more than 50 percent of aromatics are removed in the solvent refining, as much as 70 percent of the residual aromatics can be sulfonated according to the present invention. However, if less than 50 percent of aromatics are removed in the solvent refining, the percent of residual aromatics sulfonated according to the present invention should not exceed 60.

It is noted that the additional $SO_3$ reacted in run 5 over that reacted in run 6 appears to have produced no substantial amount of mahogany acids, and indeed to have converted some of the mahogany acids into green acids, with the result that a very low ratio, about 0.3, of mahogany acids to green acids was obtained.

EXAMPLE IV

In this example, the effect of sulfonation temperature on mahogany and green acid yields from a solvent-refined naphthenic lubricating oil distillate was investigated. The procedure was similar to that employed in Examples II and III except that batch operation was used and the residence time of oil in the sulfonation zone was about 13–18 minutes. In each run the consumption of $SO_3$ was about 8 grams per 100 grams of oil charge. The mole percent $SO_3$ in the reaction gases was about 10. The charge oil used was charge oil C as described in Table I. The following table shows the effect of sulfonation temperature.

Table IV

| Run No. | Sulfonation Temperature, ° F. | Mahogany Acid Yield | Ratio of Mahogany to Green Acid |
|---|---|---|---|
| 7 | 102 | 7.6 | 0.6 |
| 8 | 150 | 8.7 | 0.7 |
| 9 | 200 | 10.5 | 0.8 |
| 10 | 250 | 10.1 | 1.1 |

Generally the mahogany to green acid ratios obtained were less than in the preceding examples, probably because of the longer residence time. Short residence time appears to favor formation of mahogany acids.

This example shows that high sulfonation temperatures provide high mahogany acid yields and low green acid yields. Generally, the sulfonation temperature should be at least 180° F. to provide a commercially satisfactory ratio of mahogany to green acids.

Sulfonation runs made at temperatures below 180° F. were generally unsatisfactory in that the viscosity of the reaction products at such lower temperatures was great enough to cause difficulty in removing the reaction products from the sulfonation vessel. The present invention provides particular advantages when high sulfonation temperatures are used, in that viscous mineral oil charge stocks, e. g. those having S. U. viscosity at 100° F. of 500 seconds or more, can be sulfonated without dilution, or with dilution only by recycle oil of lower viscosity, e. g. 400 or more, obtained similarly to the manner described in Example I.

The residence time of charge oil in the sulfonation zone can vary widely, as demonstrated in the examples. It is generally preferred, however, that the residence time be short, e. g. within the approximate range 1–20 seconds, since it has been found that particularly high yields of mahogany acids can be obtained under such conditions. For example, the high yield of mahogany acids and low yield of green acid obtained in Example I, as compared with the yields obtained in the other examples, is attributable in substantial measure to the low residence time in Example I.

The residence time as the term is used here is intended to indicate, in a continuous process, the average period of time during which a given portion of charge oil moves between the point where $SO_3$ is introduced thereinto and the point where either substantially all the $SO_3$ has reacted, or the unreacted $SO_3$ is separated from the oil. Frequently, according to the present invention, e. g. in Example I, substantially all the $SO_3$ has reacted before the point is reached where exhaust gases are separated from the oil.

According to the invention, it is possible to control the degree of sulfonation, in part, by adjusting the relative rates of introduction of $SO_3$ and charge oil into the sulfonation zone. The preferred weight ratio of $SO_3$ to charge oil introduced into the sulfonation zone is about 1–20, more preferably 5–15 grams of $SO_3$ per 100 grams of charge oil. Expressing the preferred ratios of $SO_3$ to charge oil in terms of the mole ratio of $SO_3$ to aromatics in the charge oil, the preferred latter ratios are within the approximate range 0.1–2.5. It is noted that, when the above mole ratio is 2.5, the degree of sulfonation is still low enough to be suitable according to the present invention, e. g. about 60 percent. If the mole ratio is substantially above 2.5, the degree of sulfonation becomes too great and excessive amounts of green acids are formed.

By using, according to the present invention, a lower degree of sulfonation than the prior art, it is possible to use a higher sulfonation temperature without obtaining excessive amounts of green acids. At the higher sulfonation temperatures, it has been found that, surprisingly enough, although the total degree of sulfonation obtained is lower than that obtained previously, the mahogany acid yield is higher than that obtained previously, because the proportion of mahogany acids in the sulfonation product is higher.

The invention claimed is:

1. Method for preparing soluble oil which comprises: sulfonating mineral lubricating oil having S. U. viscosity at 100° F. within the approximate range 200–1000 seconds, with gaseous $SO_3$ at a temperature within the approximate range 180° F. to 300° F., while maintaining the ratio of gaseous $SO_3$ to oil within the range from 0.1 to 2.5 moles of gaseous $SO_3$ per mole of aromatics in the oil, thereby to produce mahogany sulfonic acids; separating said mahogany sulfonic acids from green sulfonic acids; saponifying such separated mahogany sulfonic acids with an alkali metal base, thereby to form alkali metal mahogany sulfonates; and blending petroleum oil with the saponified mahogany sulfonic acids to obtain a soluble oil containing a major proportion of petroleum oil.

2. Method for preparing sulfonic materials suitable for use in soluble oil which comprises: sulfonating mineral lubricating oil having S. U. viscosity at 100° F. within the approximate range 200–1000 seconds with gaseous $SO_3$ at a temperature within the approximate range 180° F. to 300° F., while maintaining the ratio of gaseous $SO_3$ to oil within the range from 0.1 to 2.5 moles of gaseous $SO_3$ per mole of aromatics in the oil, until at least 10 weight percent of the aromatics in said lubricating oil have reacted; stopping the sulfonation before 70 weight percent of the aromatics in said lubricating oil have reacted; and separating mahogany sulfonic acids from green sulfonic acids.

3. Method for preparing sulfonic materials suitable for use in soluble oil which comprises: removing from lubricating oil about 25–70 percent of the aromatics contained therein, thereby to obtain a sulfonation stock having S. U. viscosity at 100° F. within the approximate range 200–1000 seconds; sulfonating said sulfonation stock at a temperature within the approximate range 180° F to 300° F., while maintaining the ratio of gaseous $SO_3$ to oil within the range from 0.1 to 2.5 moles of gaseous $SO_3$ per mole of aromatics in the oil, until at least 10 percent of the aromatics in said sulfonation stock have reacted; and stopping the sulfonation before 70 weight percent of the aromatics in said sulfonation stock have reacted.

4. Method for preparing sulfonic materials suitable for use in soluble oil which comprises: removing from a naphthenic base lubricating oil distillate by extraction with furfural about 25–70 percent of the aromatics contained therein, thereby to obtain a sulfonation stock having S. U. viscosity at 100° F. within the approximate range 200–1000 seconds; contacting such sulfonation stock at a temperature within the approximate range 180° F. to 300° F. with 0.1 to 2.5 moles of gaseous $SO_3$ per mole of aromatics in said sulfonation stock, thereby to sulfonate 10–70 percent of the aromatics in said sulfonation stock; removing green acids from the sulfonation product, thereby to obtain a product, free from green acids, and containing substantial quantities of mahogany sulfonic acids.

References Cited in the file of this patent

UNITED STATES PATENTS

| Number | Name | Date |
|---|---|---|
| 1,909,721 | Reddish | May 16, 1933 |
| 2,205,924 | Frame | June 25, 1940 |
| 2,361,476 | Higbee et al. | Oct. 31, 1944 |
| 2,413,311 | Cohen | Dec. 31, 1946 |
| 2,499,710 | Wilson | Mar. 7, 1950 |
| 2,514,733 | Vold et al. | July 11, 1950 |